F. W. LÄSSIG.
COMBER DEVICE FOR COMBING MACHINES.
APPLICATION FILED SEPT. 29, 1910.

992,216. Patented May 16, 1911.

Witnesses: Inventor:

UNITED STATES PATENT OFFICE.

FRIEDRICH WILHELM LÄSSIG, OF CHEMNITZ, GERMANY.

COMBER DEVICE FOR COMBING-MACHINES.

992,216.  Specification of Letters Patent.  Patented May 16, 1911.

Application filed September 29, 1910. Serial No. 584,778.

*To all whom it may concern:*

Be it known that I, FRIEDRICH WILHELM LÄSSIG, a subject of the Emperor of Germany, and a resident of Chemnitz, in the Empire of Germany, have invented certain new and useful Improvements in Comber Devices for Combing-Machines, of which the following is a specification.

This invention relates to comber device for combing machines and has for its object the provision of means whereby the needles are attached to circumference of the comber.

In order that my invention may be better understood I will now proceed to describe the same in relation to the accompanying drawing hereunto annexed reference being taken to the letters and figures marked thereon.

Like letters refer to like parts in the various figures.

Figure 1:
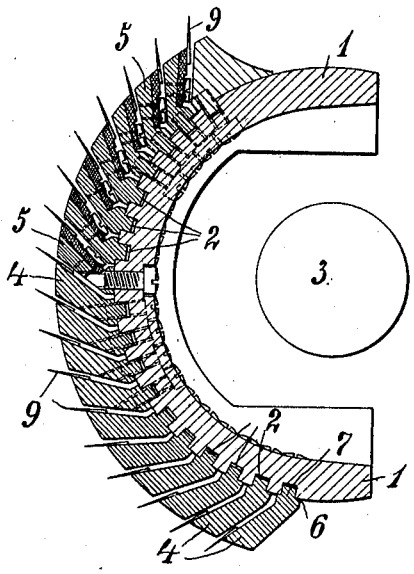
Figure 2:
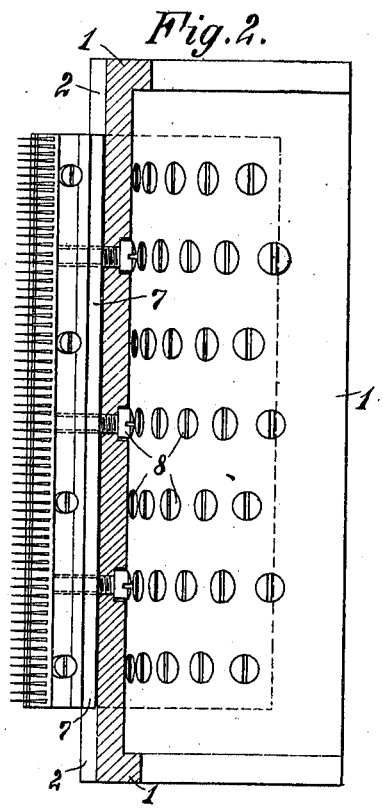
Figures 3, 5, 7:
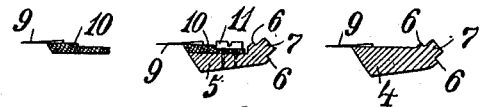
Figures 4, 6, 8:
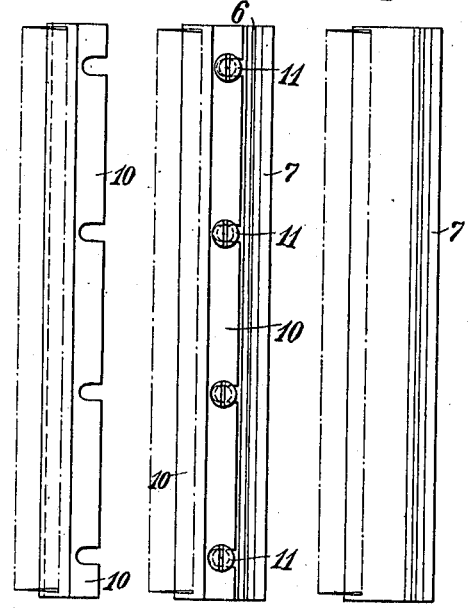

Figure 1 is a sectional elevation of the combing showing two various examples of accomplishments. Fig. 2 is a sectional plan. Fig. 3 is a sectional elevation and Fig. 4 is a plan view of a single clamp bar furnished with needles. Fig. 5 is a sectional elevation and Fig. 6 is a plan view of a clamp with needles attached to fastening-bar. Fig. 7 is a sectional elevation and Fig. 8 is a plan view of a fastening-bar furnished with needles showing the other example of accomplishment.

In the circumference of the comber-mass 1 prismatical channels 2 are milled with a cutter. The channels 2 are destined for receiving the fastening-bars 4 and 5. Each fastening-bar 4 or 5 engages the circumference of the comber with its shoulders 6. The ledge 7 is close-fitting in the channel 2. The fastening-bars 4 and 5 are attached to the comber-mass by means of the screws 8.

The above described method of fixing consisting in pressing the shoulders 6 and ledge 7 of the fastening-bars against the circumference of the comber by means of screws comprises the main point of the present invention. By this method of fixing each fastening-bars 4 or 5 is isolated, that is to say it does not touch the adjoining bars, so that any bar, after unscrewing can readily be removed, if mending is necessary.

In the example shown in Figs. 7 and 8, the needles 9 are fixed by soldering them on the fastening-bars 4 with tin solder in known manner. On account of the heat owing to soldering the fastening-bars become sometimes crooked and in that case the ledge 7 does not fit exactly into the channel 2. To avoid that drawback one should choose the other example of accomplishment shown in Figs. 3 to 6. In that case (Figs. 3 to 6) the needles 9 are soldered to thin clamps 10, which are fixed with screws 11 to the fastening-bars 5. Thus the thin clamps 10 can be easily re-straightened, when they have become crooked by soldering.

Having now particularly described and ascertained the nature of my said invention, and in what manner the same is to be performed, I declare that what I claim is:—

A combing machine of the Heilman type having a cylinder with grooves therein, comb bars inserted in the grooves and separably held therein, a strip detachably secured on the front portion of each bar and combing teeth permanently secured to said strip.

In testimony whereof I affix my signature in the presence of two witnesses.

FRIEDRICH WILHELM LÄSSIG.

Witnesses:
HANS SCHULER,
JOSEPH MUHLE.

---

Copies of this patent may be obtained for five cents each, by addressing the "Commissioner of Patents, Washington, D. C."